Figure 1:
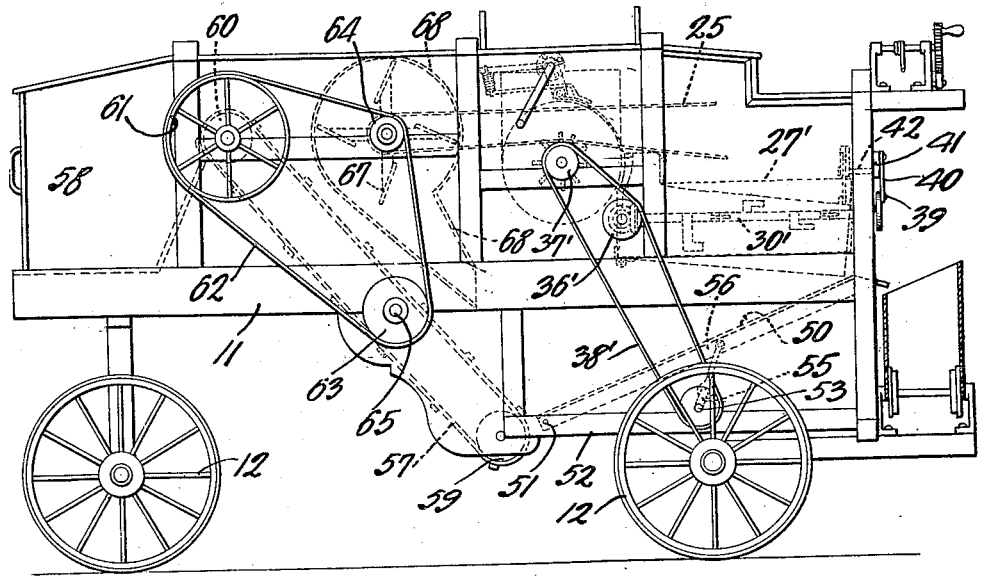

C. P. OETH.
CORN SHELLING MACHINE.
APPLICATION FILED MAY 22, 1914.

1,138,779.

Patented May 11, 1915.
3 SHEETS—SHEET 1.

Witnesses

Charles P. Oeth, Inventor
by C. A. Snow & Co., Attorneys

C. P. OETH.
CORN SHELLING MACHINE.
APPLICATION FILED MAY 22, 1914.
1,138,779.
Patented May 11, 1915.
3 SHEETS—SHEET 2.
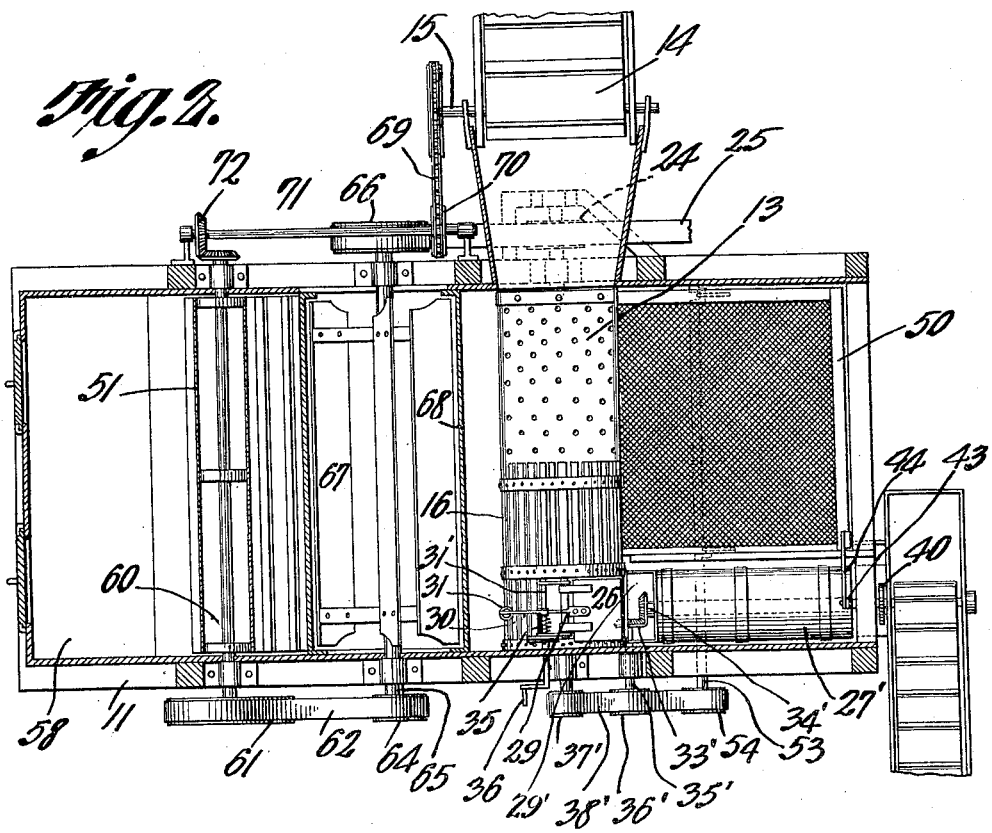
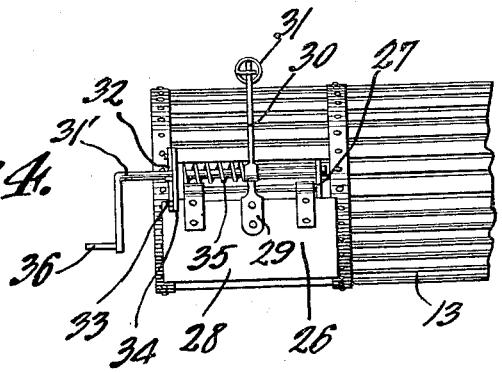
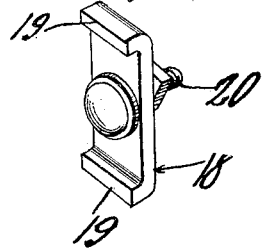
Witnesses
Charles P. Oeth, Inventor
by C. A. Snow & Co. Attorneys

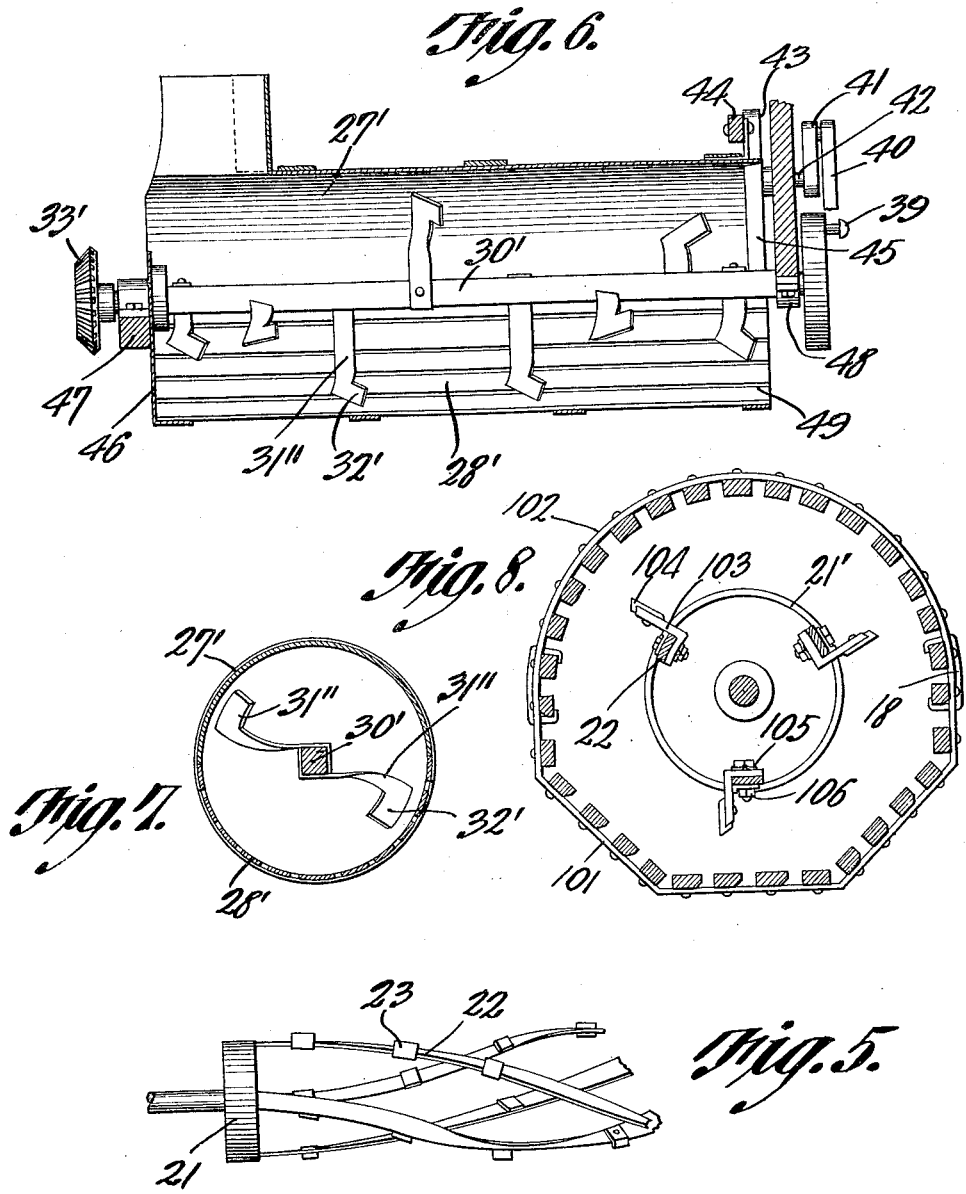

UNITED STATES PATENT OFFICE.

CHARLES P. OETH, OF MOUNT VERNON, INDIANA.

CORN-SHELLING MACHINE.

1,138,779.
Specification of Letters Patent.
Patented May 11, 1915.

Application filed May 22, 1914. Serial No. 840,266.

*To all whom it may concern:*

Be it known that I, CHARLES P. OETH, a citizen of the United States, residing at Mount Vernon, in the county of Posey and State of Indiana, have invented a new and useful Corn-Shelling Machine, of which the following is a specification.

This invention relates to improvements in corn shelling machines.

One object of the present invention is to provide a corn shelling machine which will automatically shell the corn, deliver the cob to an ejecting conveyer and deliver the shelled corn to a suitable receptacle.

A further object is to provide a corn shelling machine with a concave with an automatic door, which door will act as a valve allowing for the ejection of the partly shelled corn cob and preventing a choking of the concave.

A further object is to provide a corn shelling machine in which the cobs which pass through and are ejected from the concave will be further treated in a corn riddle drum to thus more completely shell the corn from the cob and thus preventing undue waste of corn from being ejected with the cobs.

A further object is to provide a corn riddle drum communicating with the concave into which drum extends a shaft and upon which are mounted a number of interdigitating fingers which act in the capacity of a conveyer as well as agitating the mass disposed within the drum thus completely shelling the corn from the cob.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings accompanying this specification and forming a part thereof the preferred embodiment of my invention is illustrated, in which:—

Figure 3:
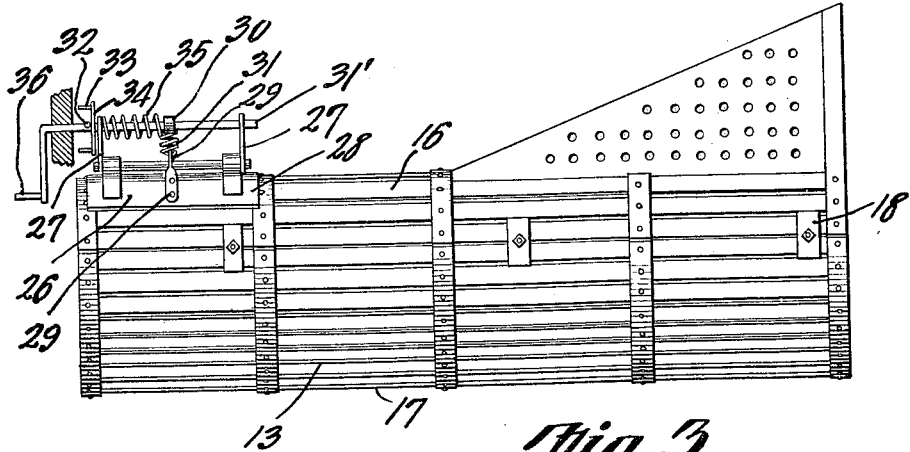

Figure 1 is a view in side elevation of my improved corn sheller. Fig. 2 is a top or plan view thereof. Fig. 3 is a view in side elevation of the concave and illustrating the valve door carried thereby. Fig. 4 is a fragmental view of the end of the concave and further discloses the construction of the valve door. Fig. 5 is a detail view in elevation of the shaft or feeder which extends through the concave. Fig. 6 is a view of the corn riddle drum and disclosing the squared shaft which extends therethrough. Fig. 7 is a cross sectional view of the corn riddle drum. Fig. 8 is a cross sectional view of the preferred form of the concave. Fig. 9 is a view in perspective of one of the clamping plates by means of which the sections of the concave are held together.

Referring to the drawings in which similar reference numerals designate corresponding parts throughout the several views, 11 indicates a longitudinally extending beam and which in the present instance has been illustrated as being supported portably above the ground by means of wheels 12 although it is to be understood that such a support is not necessary for the proper working of the machine, and may be varied if desired.

A concave 13 extends transversely across the frame defined by the beams 11 and which concave communicates with the corn elevator 14. The exact detail of this corn elevator is not illustrated as it is of the usual construction and it is sufficient to say that it is driven by the shaft 15 to which motion is imparted in a manner which will be more fully disclosed hereinafter.

The concave as illustrated in Fig. 3 forms an upper section 16 and a lower section 17 and which sections are held together by the clamp plates 18, thus allowing the sections to be readily detached, and as readily assembled. A detail view of the clamping plate 18 is disclosed in Fig. 9 and as therein illustrated includes a plate with an inturned end 19 and centrally through which plate extends a clamping bolt 20 which bolt is adapted to extend through adjacent strips which mark the upper and lower limits of the lower and upper sections of the concave thus holding the inturned ends of the plate in engagement with the strips of the concave thus locking the sections together. Extending longitudinally through the concave is a cylinder or beater 21 and which includes the spiral strips 22, to which are secured the blocks 23. Secured to one extremity of the beater 21 is a pulley wheel 24 which is driven by a belt 25 to thus rotate the said cylinder. The preferred form of the concave illustrated in Fig. 8 includes a lower section 101 which is semi-octagonal and to which is connected the semi-cylindrical upper portion 102. These sections are held together by the clamping members 18 as before described. It will be noted that as the lower portion of the concave is semi-octagonal, the corn, when traveling thereover, will be caused to assume positions at different distances from the path of the beater. Consequently the agitation of the corn is more thorough than would be the case should it be traveling over a surface concentric with the beater.

The beater 21' which extends through the concave is similar to the one illustrated in Fig. 5, with the exception that the blocks 23 are replaced by the angle members 103 which are boltedly secured to the strips 22. Rigidly secured to the angle members 103 are the agitating blades or fingers 104 which are replaceable. A locking washer 105 rigidly holds the bolt 106 in place and which bolt extends through the strips 22 for the securing of the angle members 103 thereto. As the cylinder or beater 21 revolves it forces the corn to one end of the concave and which end is provided with a valve door 26. The valve door is adapted to open and release the corn according to the pressure with which the corn bears against the door. The valve door includes the upright bearing brackets 27 upon which is pivotally mounted an actuated plate 28 and which forms the door proper. Hingedly secured to and extending from the plate 28 is the arm 29 and which is connected to a similar arm 30 by the spring coil 31. The upper arm 30 is carried by the shaft 31' and which shaft is provided with the outstanding pin 32 which is adapted to extend between and engage the pins 33 of a stationary plate 34. A compression spring 35 bears against the arm 30 and the upstanding bracket 27 and thus holds the shaft 31' in such position that the pin 32 extends between the outstanding pins 33 of the plate 34 thus locking the shaft against rotation. The extremity of the shaft 31' is provided with a handle 36 by means of which it may be shifted longitudinally against the action of the spring 35 to withdraw the pin 32 out of engagement with the outstanding pins 33 which allows the shaft 31' to be rotated to take up a new position so that the tension holding or resisting motion of the arm 29 of the arcuated plate 26 may be adjustably varied.

As the partly shelled corn is ejected through the valve door from the concave it passes into the riddle drum 27' which drum is provided with its bottom formed of longitudinally extending strips 28' which are spaced a slight distance apart allowing the shelled corn to pass therethrough similar to the manner in which it passes through the concave. The mouth 29' of the riddle drum is disposed below and adapted to receive the material as it is ejected from the concave. The riddle drum has a square shaft 30' extending therethrough upon which are mounted the interdigitating fingers 31" which are provided with the enlarged ends 32' which act in the capacity of conveyers forcing the material toward one end and longitudinally of the drum and at the same time agitating the material to remove all corn which may be adhering to and remaining upon the cobs. The shaft 30' is provided with a beveled gear 33' and which meshes with a beveled gear 34' upon a jack shaft 35' the latter being driven by a belt wheel 36' which is connected to a similar belt wheel 37' upon the beater 21 which extends through the conveyer, by the belt 38'. The shaft 30' has secured to the end remote from the gear 33' a crank arm 39 which is secured by the link 40 to the second crank arm 41. The crank arm 41 is carried by the shaft 42 to which is secured a second crank arm 43 and which is pivotally secured to the cob riddle drum 27' by the link 44 clearly illustrated in Figs. 2 and 6 of the drawing. Thus as the shaft 30 is rotated a lateral and jouncing motion will be imparted to the cob riddle drum it being mounted for such motion by the arm support 45 which rests upon the shaft at the end which is laterally shaken. The remote extremity of the cob riddle drum is supported by means of the end of the drum 46 being rotatably mounted upon the shaft. The shaft is supported by suitable bearings 47 and 48 and which bearings thus indirectly support the cob riddle drum. The rear extremity 49 of the drum is open so that the cobs delivered to the drum will be ejected therefrom after having been suitably treated by the fingers 31" and by the agitating motion of the entire drum. The contents of the drum as it is ejected drops upon the screen 50 which is pivotally secured at its lower extremity as at 51 to a lower sub-frame 52 carried by the main frame 11. A shaft 53 which is provided with a belt wheel 54 at one end extends transversely of the frame and is provided intermediate its ends with the offset crank arm 55 and which imparts motion to the screen by the link 56. Thus the shelled corn passes between the slats or strips of the concave and cob riddle drum and falls upon the shaking screen 56 and is shaken down upon a conveyer 57 by means of which it is delivered into a receiving bin 58. The belt wheel 54 is driven by the belt 38' which drives the belt pulley 36 of the jack shaft before mentioned.

The conveyer 57 is mounted upon the wheel 59 at its lower extremity and upon the wheel 60 at its upper extremity. Motion is imparted to the upper wheel 60 of the conveyer by the pulley wheel 61 which is driven by the belt 62, the latter passing over the driving belt wheel 63 and over the fan belt wheel 64. The driving belt wheel 63 is carried by the shaft 65 upon which is mounted the belt wheel 66 the latter being driven by the belt 25 which also drives the wheel 24 as previously explained.

The fan blower 67 extends transversely across the frame and as illustrated clearly in Fig. 1 by means of the casing 68 directs a blast of air beneath the concave and corn cob riddle drum and down upon the shaking screen 50. The elevator 14 is driven by the chain 69 which chain extends over a sprocket wheel 70 mounted upon the shaft 71 and which in turn is, through the intervention of the beveled gears 72, driven by the upper wheel 59 of the conveyer. The corn elevator 14 receives the corn and delivers the same into the mouth of the conveyer. The corn is held within the concave and the cobs are ejected through the valve door 26 into the cob riddle drum. The shelled corn as it passes through the opening in the concave drops upon the screen 50 and is taken down into conveyer 57. It will be practically impossible to shell the entire corn in the concave and for which reason the cob riddle drum is provided and which is adapted to practically remove all of the corn from the cob and deliver the same to the screen 50. The open end of the cob riddle drum delivers the cobs upon a cob conveyer which is provided for the disposal of the cobs.

Having thus fully described my invention, what I claim as new is:—

1. A corn shelling machine comprising a concave, an agitating shaft extending therethrough, a movably mounted cob riddle drum adapted to receive the material as it is ejected from the said concave, means for vibrating the said cob riddle drum.

2. A corn shelling machine comprising a concave, an outlet therefor, a resiliently mounted door valve controlling the discharge of cobs therefrom, an agitating shaft extending therethrough, a cob riddle drum adapted to receive the material as it is ejected from the said concave, means for actuating the said cob riddle drum, means disposed beneath the cob riddle drum and the concave and adapted to receive the shelled corn therefrom.

3. A corn shelling machine comprising a concave, and a pressure controlled discharge outlet therefor, an agitating shaft extending therethrough, a cob riddle drum adapted to receive the material as it is ejected from the said concave, means for vibrating the said cob riddle drum, a shaking screen disposed beneath the cob riddle drum and the concave and adapted to receive the shelled corn therefrom.

4. A corn shelling machine comprising a concave, means extending therethrough adapted to agitate and move the contents longitudinally thereof, a valve-like door with the opening thereof controlled by the pressure exerted thereagainst carried by and communicating with the concave, a cob riddle drum communicating with the concave and closed therefrom by the said valve-like door, means extending through the said cob riddle drum adapted to agitate the contents and move the same longitudinally thereof, means for agitating the said drum to shake the contents thereof, and means for collecting the shelled corn passing through the concave and the cob riddle drum.

5. A corn shelling machine comprising a concave, means extending therethrough adapted to agitate and move the contents longitudinally thereof, a valve-like door with the opening thereof controlled by the pressure exerted thereagainst carried by and communicating with the concave, a cob riddle drum communicating with the concave and closed therefrom by the said valve-like door, means extending through the said cob riddle drum adapted to agitate the contents and move the same longitudinally thereof, means for agitating the said drum to shake the contents thereof, means for collecting the shelled corn passing through the concave and the cob riddle drum, and a conveyer communicating with the axis of the said cob riddle drum adapted to convey the cobs away therefrom.

6. A valve-like door for a concave comprising an arcuated plate, means for hingedly mounting the same, an arm carried by the said plate, and a second arm resiliently connecting the first mentioned arm, and means for locking the second mentioned arm rigidly in adjusted positions.

7. A corn shelling machine comprising a concave, means for delivering corn thereto, a pressure controlled door carried by the concave and serving as an outlet for the cobs and controlled by the pressure exerted thereagainst, a cob riddle drum adapted to receive the contents of the concave as it is ejected through the said valve door, said concave and cob riddle drum provided with slotted bottoms, means extending through the said concave and through the cob riddle drum adapted to agitate the contents thereof and to move the same in a longitudinal manner, and means for bodily shaking the said cob riddle drum.

8. A valve-like door for a concave comprising an arcuate plate, means for hingedly mounting the same, an arm carried by the said plate, and a second arm resiliently connected to the first mentioned arm, means for locking the second mentioned arm rigidly in adjusted positions, and a coiled spring to regulate the tension on said valve-like door.

In testimony that I claim the foregoing as my own, I have hereto affixed my signature in the presence of two witnesses.

CHARLES P. OETH.

Witnesses:
 JESSE E. WADE,
 F. P. LEONARD.

Copies of this patent may be obtained for five cents each, by addressing the "Commissioner of Patents, Washington, D. C."